Patented Sept. 21, 1954

2,689,832

UNITED STATES PATENT OFFICE 2,689,832

METHOD OF CONVERTING WEAKLY BASIC ANION-EXCHANGE RESINS TO STRONGLY BASIC RESINS

Jesse C. H. Hwa, Philadelphia, Pa., assignor to Rohm & Haas Company, Philadelphia, Pa., a corporation of Delaware No Drawing. Application September 21, 1951,
Serial No. 247,759

6 Claims. (Cl. 260—2.1)

This invention relates to a process of preparing strongly basic anion-exchange resins. It relates to a process wherein weakly basic anion-exchange resins, in which the polar, anion-adsorbing groups are tertiary amino groups, are converted to strongly basic anion-exchange resins in which the polar, anion-adsorbing groups are quaternary ammonium groups.

Anion-exchange resins of the weakly basic type and the strongly basic type are well known and are available commercially. The differences in performance of the two kinds of resins are also well recognized. It is established, for example, that stronglyl basic anion-exchangers are capable of splitting neutral salts, such as sodium chloride, in solution and of exchanging the hydroxyl anions of the anion-exchange resin for the anions of the salt. Weakly basic anion-exchange resins, on the other hand, do not split neutral salts to any appreciable extent although they are capable of adsorbing acids, as such, from solution.

This invention, which provides a means of changing weakly basic anion-exchange resins into strongly basic resins comprises reacting, in an aqueous medium, an alkylene oxide containing 2 or 3 carbon atoms, i. e. ethylene oxide, 1,2-propylene oxide or 1,3-propylene oxide, with a weakly basic resin which contains tertiary amino groups.

Weakly basic anion-exchange resins containing tertiary amino groups which are employed in the instant invention are well known. They are made by halomethylating a cross-linked, insoluble copolymer of a monovinyl hydrocarbon such as styrene and aminating the halomethylated copolymer by reaction with a secondary amine according to the process of C. H. McBurney's application Serial No. 759,309 filed July 5, 1947, now Patent No. 2,591,574. In either case, tertiary amino groups become attached through methylene groups to the aromatic nuclei of the insoluble polymer or macromolecule.

The process of this invention is carried out in aqueous media and is exemplified by the following representation wherein Pol stands for the insoluble macromolecule or polymer, to which are joined the respective, tertiary amino, polar groups, represented by

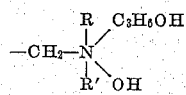

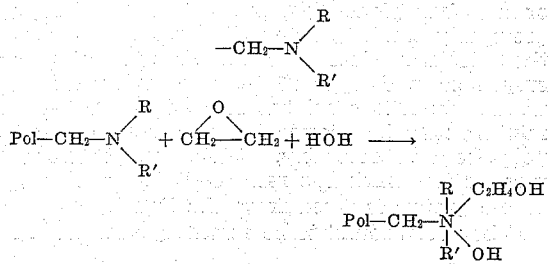

Of course when the propylene oxides are employed, the polar groups of the product have the formula

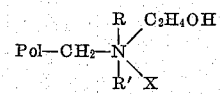

When, as in the above representation, the resin containing the tertiary amino groups is employed in the basic form, then the resultant product contains quaternary ammonium hydroxide groups. When, however, the salt form of the resin is used, then the product contains quaternary ammonium salt groups according to the following representation wherein HX, for the sake of illustration, represents an acid of which X is the anion:

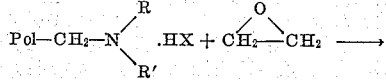

It is not really important, as far as the product is concerned, whether the resin containing the tertiary amino groups is used in the basic or the salt form because the anions on the quaternary ammonium product, represented above by —OH and —X, are readily replaced by or exchanged for other anions by simply treating the quaternary ammonium resin with an excess of another anion. Thus quaternary ammonium hydroxide groups are changed to quaternary ammonium chloride groups by treating the resin with an excess of sodium chloride, for example; or conversely the quaternary ammonium chloride groups are changed to quaternary ammonium hydroxide groups by treatment of the resin with an excess of sodium hydroxide.

What is important here is that a weakly basic anion-exchange resin containing tertiary amino groups is converted readily and efficiently into a strongly basic anion-exchange resin having quite different and decidedly advantageous properties. All of the products are strongly basic by virtue of the presence of the quaternary ammonium groups having the generic formula

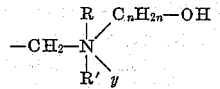

in which R and R' represent monovalent organic radicals, preferably alkyl, aryl, cycloalkyl, and aralkyl radicals, $n$ is an integer of value 2 to 3, and $y$ is an anion, preferably an hydroxyl ion, a chloride ion, or a sulfate ion.

The base polymer is most conveniently formed from styrene and divinylbenzene. Both of these materials are readily available and may be easily copolymerized by well known methods to give an insoluble polymer that possesses excellent physical and chemical properties. The divinylbenzene component of such a copolymer gives to the polymeric molecule a cross-linked structure which greatly increases the complexity of the molecule and decreases its solubility and compatibility with other materials. By varying the amount of the divinylbenzene used in the preparation of the copolymer, variations can be made in the physical properties of the polymeric material which carry through to the final ion-exchange material and which have a marked effect upon its utility. In general, the divinylbenzene component may vary from 0.1% to 40% of the total polymerizable materials on a molar basis. In practice, however, it is preferable to use at least 0.5% and for most purposes no benefit is derived from using over 8%. Copolymers made with from 0.5% to 2% divinylbenzene give finished ion-exchange resins of low density and high porosity. Denser resins of lower porosity are obtained by increasing the percentage of divinylbenzene in the copolymer, preferably to from 4% to 8% of the copolymer.

In place of styrene other aromatic monovinyl compounds can be used and in place of divinylbenzene other polyvinyl aromatic compounds can be used. Ortho-, meta-, and para-methyl styrenes, ortho-, meta-, and para-ethyl styrenes, and vinyl-naphthalene are suitable monovinyl aromatic compounds. Likewise, the divinyltoluenes, naphthalenes, and xylenes as well as divinylethylbenzene and trivinylbenzene are suitable cross-linking polyvinyl aromatic compounds. What was said above concerning the amount of divinylbenzene as a cross-linking agent applies to these materials as well.

While it is preferable to use a polyvinyl aromatic compound to cross-link the polymeric molecule, the cross-linking can be accomplished by other means, one of which consists of the introduction of methylene bridges between the aromatic nuclei of a linear polymer of an aromatic monovinyl compound. This type of cross-linking is accomplished during the step of chloromethylating the polymeric materials and is hereinafter explained in detail.

The base polymeric material may be formed by any of the known polymerization processes such as polymerization in mass, in solvents for the monomeric material or in emulsion or suspension in a liquid that is not a solvent for the monomeric material. The last is the preferred method because it produces the polymer directly in the form of small spheroids or beads, the size of which can be regulated and controlled.

The polymerization of the vinyl compounds is accelerated by means of well known catalysts which provide oxygen. These catalysts include ozone; organic peroxidic agents typified by ozonides, peroxides such as acetyl peroxide, lauroyl peroxide, stearoyl peroxide, tert.-butyl hydroperoxide, benzoyl peroxide, tert.-butyl perbenzoate, di-tert.-butyl diperphthalate, di-tert.-butyl peroxide, and the barium salt of tert.-butyl hydroperoxide; inorganic agents such as barium peroxide, sodium peroxide, hydrogen peroxide, and the so-called "per" salts such as the water-soluble perborates, persulfates, and perchlorates. The catalysts are employed in suitable amounts ranging from 0.1% to about 2.0% based on the weight of the monomeric material to be polymerized.

The next step in the preparation of the ion-exchange resins is that one in which the particles of insoluble, polymeric, aromatic hydrocarbon are chloromethylated. This can be done by means of various chloromethylating agents, but the procedure which is by far the most preferred is to treat the particles with chloromethyl ether and a Friedel-Crafts catalyst. During the step of chloromethylating, some cross-linking of the polymer by the chloromethylating agent can take place. The amount of such cross-linking appears to be inversely proportional to the amount of cross-linking already present prior to the chloromethylating step. In the preferred embodiment of this invention the particles of insoluble and cross-linked polymer are immersed in chloromethyl ether and an inert organic liquid which swells the particles of polymer. The word "inert" is used in its accepted sense to indicate that the organic liquid does not react with any of the other materials which are present. Very satisfactory swelling-liquids are the chlorinated aliphatic hydrocarbons such as ethylene dichloride, trichloroethane, tetrachloroethane, tetrachloroethylene and the like.

The extent of the chloromethylation reaction is conveniently determined by a halogen analysis. It is desirable that as many chloromethyl groups as possible be introduced into the insoluble copolymer because the number of such groups determines the number of quaternary ammonium groups that can be introduced into the final product; and the number of such quaternary ammonium groups determines the capacity of the resin to adsorb anions. Although resins containing relatively few quaternary ammonium groups have some capacity for adsorbing or exchanging anions, it is necessary from a practical standpoint to add a large number of such groups in order to produce a resin of sufficiently high capacity to be commercially attractive. The number of such groups should be at least one for every 15 aromatic hydrocarbon nuclei in the polymer. A chloromethylated copolymer of 99% styrene and 1% divinylbenzene having this number of chloromethyl groups contains about 2% chlorine by analysis. The upper limit of chloromethylation is that reached when every available position in the aromatic nuclei is chloromethylated. Satisfactory resins of high capacity, however, can be made in which the number of chloromethyl groups, and hence the number of quaternary ammonium groups which can be introduced, is less than the theoretical maximum. Thus, very valuable resins are those made by aminating polymers containing one to six chloromethyl groups for every four aromatic hydrocarbon nuclei. After the chloromethylation reaction is complete, water is added in order to remove the Friedel-Crafts catalyst and any unreacted chloromethyl ether. The particles of chloromethylated resin are then separated, for example, by filtration.

The next step is the amination of the chloromethylated copolymer with a secondary amine or a polyalkylenepolyamine. This reaction is preferably carried out by adding the amine to the chloromethylated polymer while the latter is suspended and agitated in a liquid, including water, which is a solvent for the amine. The mixture may be allowed to react at room temperature or, preferably, at elevated temperatures, after which the resin containing tertiary amino groups is freed from the liquid.

It has been found to be advantageous to swell the chloromethylated polymer prior to its reaction with the amine. This swelling facilitates the subsequent amination reaction and may be carried out by soaking the polymer in a suitable liquid, the most common of which are aromatic hydrocarbons, such as benzene and toluene, and chlorinated aliphatic hydrocarbons, such as ethylene dichloride, trichloroethane, tetrachloroethane, perchloroethylene, and the like.

The amines are best used in the form of the free base. The organic groups on the amino nitrogen atom are not altered in the reaction. Those amines are preferred in which the organic groups attached to the nitrogen atom, and represented above by R and R', are monovalent hydrocarbon groups; but it is true that other amines may be used wherein the hydrocarbon radical of the amine carries a substituent group, such as an hydroxyl group, as in diethanolamine or an amino group as in diethylenetriamine. Furthermore, compounds such as morpholine and pyrrolidine can be employed. The hydrocarbon portion of the amines, i. e. groups R and R' in the general formulas above, can be aliphatic, aromatic, cycloaliphatic, araliphatic and alkaromatic. The following typify those amines which are suitable in this invention when used individually or in mixtures with one another: dimethylamine, diethylamine, dibutylamines, dicyclohexylamine, dibenzylamine, methylaniline, cyclohexylmethylamine, diphenylamine, dinaphthylamine, benzylethylamine, di-(p-ethyl)-phenylamine, and triethylenetetramine. When an amine such as diethylenetriamine is used, the aminated resin is subjected to exhaustive methylation in order to convert the amino groups to tertiary amino groups.

The final step, which is the improvement of this invention, comprises reacting the weakly basic anion-exchange resin, prepared in the above manner with ethylene oxide or a propylene oxide whereby the tertiary amino groups of the resin are converted to quaternary ammonium groups. This is done by reacting the alkylene oxide with the resin containing tertiary amino groups while the resin is suspended and agitated in an aqueous medium. The particles of resin are suspended in the aqueous medium and reacted with the alkylene oxide at a temperature of 0° to 100° C. Since some decomposition occurs at temperatures above about 60° C. and increases as the temperature is raised and since the reaction is sluggish below normal room temperature, it is much preferred to carry out the reaction within the temperature range of about 20° C. to 60° C. The reaction is best conducted in a closed system.

The alkylene oxide can be bubbled into the aqueous suspension of the resin containing the tertiary amino groups or it can be cooled and added as a liquid. The resultant reaction is exothermic and during the reaction the particles of resin swell further as they react with the alkylene oxide. While there is no limit, within reason, to the time during which the resin and the alkylene oxide can be reacted, it is advisable to carry on the reaction for at least two hours in order to assure a reasonable extent of reaction. In commercial practice, a reaction period of 4 to 10 hours is recommended. The course of the reaction can be readily followed by removing a portion of the resin, placing it in a column, which can be a burette or pipette, pouring a solution of sodium chloride through it slowly, and titrating, with standard hydrochloric acid, the amount of sodium hydroxide which is in the effluent and which is generated by the exchange of hydroxyl ions of the quaternary ammonium groups on the resin for chloride ions in the solution of sodium chloride.

The following examples serve to illustrate the preferred mode of carrying out the process of this invention.

*Example 1*

A. *Preparation of a base polymer.*—Into a container equipped with thermometer, mechanical stirrer and reflux condenser were poured 4000 parts of water and 340 parts of a 1.5% aqueous dispersion of magnesium silicate. Agitation was begun and a solution of 900 parts of styrene, 60 parts of ethylstyrene and 40 parts of divinylbenzene, containing 10 parts of dissolved benzoyl peroxide, was added. The stirred mixture was then heated to 90° C. and held there for 1.5 hours after which the mixture was heated at refluxing temperature for an additional 1.5 hours. The reaction mixture was then cooled to room temperature and the solid spheroids or beads of the copolymer were separated from the liquid by decantation and filtration, were air-dried, and were finally dried in an oven for two hours at 125° C.

B. *Preparation of the chloromethylated copolymer.*—Five hundred parts of the beads of the copolymer prepared in part A above were placed in a container equipped with stirrer, thermometer and reflux condenser. This amount corresponds to 5.0 moles of styrene in the form of a cross-linked copolymer. A thousand parts (12.5 moles) of chloromethyl ether, $CH_3OCH_2Cl$, were added together with 1000 parts of ethylene dichloride. Agitation was begun and the reaction mixture was cooled slowly to 0° C. by means of an ice-salt bath. During this period the particles swelled markedly. Three hundred parts (2.3 moles) of anhydrous aluminum chloride were added in small portions over a period of one hour, after which the mixture was stirred at 0° C. for two hours. Then 5000 parts of ice-water were slowly added in order to decompose the excess of aluminum chloride and chloromethyl ether. The resultant mixture was stirred for 30 minutes and filtered. The beads were washed with water and then subjected to steam-distillation for an hour in order to free them of ethylene dichloride. They were cooled rapidly, filtered, and dried at 65° C. for 24 hours. They contained 18.3% chlorine by analysis.

C. *Amination of the chloromethylated beads.*— In a container equipped with mechanical stirrer, thermometer, gas-inlet tube and reflux condenser were placed 144.3 parts (0.73 mole) of the chloromethylated beads prepared by the process of part B above. Three hundred parts of toluene were added and the mixture was boiled for an hour and then cooled to room temperature. While the mixture was stirred at 30°–35° C., 93.5 parts (2.1 moles) of dimethylamine were passed in. The mixture was then stirred at room temperature for 20 hours. The product was drained and thoroughly washed with toluene. The toluene was then removed and the resin was dried at 65° C. for 24 hours. The product, which contained 5.9% nitrogen, was a weakly basic anion-exchange resin which had a capacity for adsorbing acids of approximately 4.2 milliequivalents per gram. It did not, however, adsorb chloride ions to any extent from aqueous solutions of sodium chloride.

D. *Conversion of weakly basic anion-exchanger into strongly basic anion-exchanger.*—Into a container equipped with mechanical stirrer, thermometer and reflux condenser was put a mixture of 151 parts of the product of part C above and 500 parts of water. This amount of the resin is equivalent to 0.64 mole. To the stirred mixture at room temperature was added 61 parts (1.4 moles) of liquid ethylene oxide. Although no external heat was applied the exothermic reaction which occurred carried the temperature to 43° C. After the initial exotherm had subsided the reaction mixture was stirred at 40°–45° C. for 5 hours. During this time the resin became swollen and turned to a light brown color. The mixture was cooled to room-temperature and was stirred overnight. The resin was then separated and washed with water. It had a nitrogen-content of 4%, a density of 43.6 lbs./cu. ft., and a capacity of 2.75 milliequivalents/gram, or 1.19 milliequivalents/ml., for adsorbing chloride ions from an aqueous solution of sodium chloride. As prepared, the product contained quaternary ammonium hydroxide groups and was strongly basic. It was readily converted into the chloride form by treatment with an excess of 2 N-hydrochloric acid solution. Furthermore, it was most readily regenerated to the hydroxide form by treatment with dilute solutions of sodium hydroxide.

The conversion of a weakly basic anion-exchange resin in the form of the hydrochloride salt to a strongly basic resin in the quaternary ammonium chloride form is illustrated by the following example.

*Example 2*

Forty-four parts (0.185 mole) of the dry resin prepared by the process of parts A, B, and C of Example 1 above were mixed and stirred in 200 parts of boiling water for one hour, during which time the particles of resin swelled. The mixture was cooled and to it was added 40 parts of concentrated hydrochloric acid. The resultant mixture was stirred at 40°–50° C. for 2 hours after which it was filtered and the separated resin was washed free of acid.

Then the resin, in the form of the hydrochloride salt, was mixed with 17 parts of ethylene oxide and 100 parts of water and the mixture was heated over a period of 3 hours to 50°–60° C. and held there for 8 hours. The mixture was cooled and filtered, and the beads of resin were thoroughly washed with water.

The product was a strongly basic anion-exchange resin of which the quaternary ammonium hydroxide groups had a capacity of 2.85 milliequivalents per gram of resin.

One advantage of employing a weakly basic anion-exchange resin while it is in the salt form is that higher temperatures can be safely used during the reaction with the ethylene or propylene oxide, and at a given temperature less decomposition occurs.

*Example 3*

Fifty parts (0.218 mole) of a weakly basic anion-exchange resin prepared by the process of parts A, B, and C of Example 1 above were swelled by being boiled for an hour in 200 parts of water. The mixture was then cooled and to it was added 23 parts (0.4 mole) of propylene oxide-1,2 after which it was stirred at 40° C. for 3 hours. The resin was then separated by filtration and was washed with water. It was a strongly basic anion-exchange resin which contained quaternary ammonium groups, was able to split neutral salts such as sodium chloride and adsorb the anions thereof, and had a capacity of 2.1 milliequivalents per gram.

A weakly basic anion-exchange resin, made by aminating the chloromethylated product of part B of Example 1 above with diethylenetriamine and then exhaustively methylating the product with formic acid and formaldehyde, was converted into a strongly basic anion-exchange resin containing quaternary ammonium groups by reaction with ethylene oxide in the same general manner as is described above.

I claim:

1. A process of converting a weakly basic anion-exchange resin, said resin being an insoluble, cross-linked copolymer of 0.5% to 8% divinylbenzene and 92% to 99.5% styrene to the aromatic hydrocarbon nuclei of which copolymer are attached polar tertiary amino groups having the formula

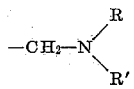

in which R and R' represent hydrocarbon radicals, into strongly basic anion-exchange resins which contain polar quaternary ammonium groups having the formula

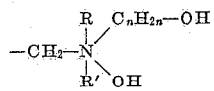

in which R and R' are identical with the same characters described above and $n$ is an integer of value 2 to 3, which process comprises reacting said weakly basic anion-exchange resin with an alkylene oxide from the class consisting of ethylene oxide, 1,2-propylene oxide, and 1,3-propylene oxide at a temperature from 0° C. to 100° C. in an aqueous medium.

2. A process of converting a weakly basic anion-exchange resin, said resin being an insoluble, cross-linked copolymer of 0.5% to 8% divinylbenzene and 92% to 99.5% styrene to the aromatic hydrocarbon nuclei of which copolymer are attached polar tertiary amino groups having the formula

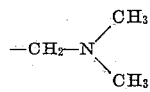

into strongly basic anion-exchange resins which contain polar quaternary ammonium groups having the formula

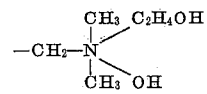

which process comprises reacting said weakly basic anion-exchange resin with ethylene oxide at a temperature from 20° C. to 60° C. in an aqueous medium.

3. A process of converting a weakly basic anion-exchange resin, said resin being an insoluble, cross-linked copolymer of 0.5% to 8% divinylbenzene and 92% to 99.5% styrene to the aromatic hydrocarbon nuclei of which copolymer are attached polar tertiary amino groups having the formula

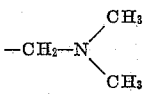

into strongly basic anion-exchange resins which contain polar quaternary ammonium groups having the formula

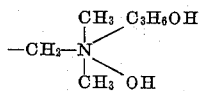

which comprises reacting said basic anion-exchange resin with propylene oxide at a temperature from 20° C. to 60° C. in an aqueous medium.

4. A process of converting a weakly basic anion-exchange resin containing polar tertiary amino groups attached to the hydrocarbon nuclei of an insoluble, cross-linked copolymer of 0.5% to 8% of a polyvinyl hydrocarbon and 92% to 99.5% of a monovinyl hydrocarbon into a strongly basic anion-exchange resin, which comprises reacting said weakly basic anion-exchange resin with an alkylene oxide from the class consisting of ethylene oxide, 1,2-propylene oxide, and 1,3-propylene oxide at a temperature from 0° C. to 100° C. in an aqueous medium.

5. A process of converting a weakly basic anion-exchange resin containing polar tertiary amino groups attached to the hydrocarbon nuclei of an insoluble, cross-linked copolymer of 0.5% to 8% divinylbenzene and 92% to 99.5% styrene into a strongly basic anion-exchange resin, which comprises reacting said weakly basic anion-exchange resin with an alkylene oxide from the class consisting of ethylene oxide, 1,2-propylene oxide, and 1,3-propylene oxide at a temperature from 0° C. to 100° C. in an aqueous medium.

6. A process of converting a weakly basic anion-exchange resin, said resin being an insoluble, cross-linked copolymer of 0.5% to 8% divinylbenzene and 92% to 99.5% styrene to the aromatic nuclei of which copolymer are attached polar tertiary amino groups having the formula

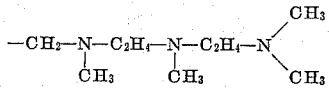

into strongly basic anion-exchange resins which contain polar quaternary ammonium groups having the formula

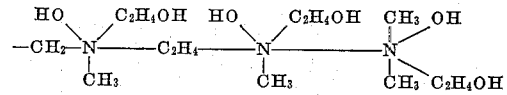

which process comprises reacting said weakly basic anion-exchange resin with ethylene oxide at a temperature from 20° to 60° C. in an aqueous medium.

References Cited in the file of this patent
UNITED STATES PATENTS

| Number | Name | Date |
|---|---|---|
| 2,543,666 | Michael | Feb. 27, 1951 |
| 2,571,120 | De Groote | Oct. 16, 1951 |
| 2,614,099 | Bauman | Oct. 14, 1952 |